US006079199A

United States Patent [19]
McCaldon et al.

[11] Patent Number: 6,079,199
[45] Date of Patent: Jun. 27, 2000

[54] DOUBLE PASS AIR IMPINGEMENT AND AIR FILM COOLING FOR GAS TURBINE COMBUSTOR WALLS

[75] Inventors: Kian McCaldon, Orangeville; Robert Ming Lap Aze; Parthasarathy Sampath, both of Mississauga, all of Canada

[73] Assignee: Pratt & Whitney Canada Inc., Longueuil, Canada

[21] Appl. No.: 09/089,451

[22] Filed: Jun. 3, 1998

[51] Int. Cl.[7] .................... F02C 7/20; F23R 3/06; F23R 3/54

[52] U.S. Cl. .................... 60/39.32; 60/755; 60/757

[58] Field of Search .................... 60/39.32, 752, 60/754, 755, 756, 757, 759, 760

[56] References Cited

U.S. PATENT DOCUMENTS

| | | | |
|---|---|---|---|
| 3,570,241 | 3/1971 | Alexander . | |
| 3,844,116 | 10/1974 | Matto | 60/39.32 |
| 3,869,864 | 3/1975 | Bunn | 60/757 |
| 3,965,066 | 6/1976 | Sterman et al. | 60/757 |
| 4,077,205 | 3/1978 | Pane et al. | 60/39.32 |
| 4,109,459 | 8/1978 | Ekstedt et al. | 60/757 |
| 4,614,082 | 9/1986 | Sterman et al. | 60/39.32 |
| 4,628,694 | 12/1986 | Kelm et al. | 60/752 |
| 4,695,247 | 9/1987 | Enzaki et al. | 431/352 |
| 4,901,522 | 2/1990 | Commaret et al. | 60/39.32 |
| 4,912,922 | 4/1990 | Maclin | 60/39.32 |
| 5,435,139 | 7/1995 | Pidcock et al. | 60/757 |
| 5,528,904 | 6/1996 | Jones et al. | 60/753 |
| 5,598,697 | 2/1997 | Ambrogi et al. | 60/39.02 |
| 5,758,504 | 6/1998 | Abreu et al. | 60/754 |

*Primary Examiner*—Ted Kim
*Attorney, Agent, or Firm*—Jeffrey W. Astle

[57] ABSTRACT

A one piece cold combustor wall for lining the reverse flow hot combustor wall of a gas turbine engine, disposed at a distance from the outer surface of the hot combustor wall. Improved cooling of the hot combustor wall results from the addition of impingement cooling air injected through orifices in the cold combustion wall directed at the hot combustion wall together with film cooling by air conducted between the hot and cold combustor walls. The cold combustor wall is perforated with a pattern of air impingement inlet orifices through the cold combustor wall conducting compressed air from the outer surface of the cold combustor wall in compressed air jets directed at the outer surface of the hot combustor wall. The provision of a cold combustor wall also improves conventional air film cooling by adding impingement cooling and reusing the air after impingement to form a contained air film between the hot and cold walls. An air cooled thermal expansion joint joins the hot and cold walls at a downstream end with interlocking flanges, with sliding seal surfaces disposed on parallel adjacent sides.

3 Claims, 3 Drawing Sheets

DOUBLE PASS AIR IMPINGEMENT AND AIR FILM COOLING FOR GAS TURBINE COMBUSTOR WALLS

TECHNICAL FIELD

The present invention relates to improving cooling of the hot combustor wall of a gas turbine engine combustor by addition of impingement cooling jets in a cold combustor wall lining the hot combustor wall to supplement film or effusion cooling, and also the inclusion of a thermal expansion joint in the hot combustor wall for relief of accompanying thermally induced stresses.

BACKGROUND OF THE ART

The general construction and operation of combustion chambers or combustors in gas turbine engines is considered to be well known to those skilled in the art. The present invention is directed to a cold combustor wall which is used to line the hot combustor wall of a gas turbine engine for improving cooling by addition of impingement cooling jets.

Within the combustor, fuel fed through the fuel nozzle is mixed with compressed air provided from a high pressure compressor and ignited to drive turbines with the hot gases emitted from the combustor. Within the metal combustor, the gases burn at approximately 3,500 to 4,000 degrees Fahrenheit. The combustion chamber is fabricated of metal which can resist extremely high temperatures, however, even highly resistant metal will melt at approximately 2,100 to 2,200 degrees Fahrenheit.

As is well known to those skilled in the art, the combustion gases are prevented from directly contacting the metal of the combustor through use of a cool air film which is directed along the internal surfaces of the combustor. The combustor has a number of louver openings through which compressed air is fed parallel to the hot combustor walls. Eventually the cool air curtain degrades and is mixed with the combustion gases. Spacing of louvers and cool air curtain flow volumes are critical features of the design of the combustors.

The turbulence of combustion gases within the combustor leads to rapid degradation of the air film cooling adjacent the hot combustor walls. Particularly where the hot combustion gases are being redirected as in the large exit duct of a reverse flow combustor, the interaction between turbulent combustion gases and the cool air film along the hot combustor wall leads to rapid deterioration of the cooling air film. As a result, it is generally necessary to increase the volume and flow rate of cooling air in such critical areas. Introduction of cooling air may not be optimally efficient for the completion of combustion nor for the presentation of hot combustion gases to the turbines. However, for lack of a better solution, designers have conventionally accepted a degree of inefficiency caused by excessive use of cooling air film as a necessary part of combustor design.

It is an object of the invention to provide improved cooling for the hot combustor wall, particularly in the critical area of the large exit duct portion where rapid degradation of cooling air films is prevalent.

It is a further object of the invention to provide for relief of thermally induced stresses in the hot combustor wall to optimize the design of the combustor.

It is a further object of the invention to provide improved cooling efficiency for the hot combustor wall which permits the designer to compensate for deficiencies in conventional cooling systems and particularly to address local areas of the hot combustor wall which are not adequately served by conventional air film cooling systems.

DISCLOSURE OF THE INVENTION

The invention provides a cold combustor wall for lining the hot combustor wall of a gas turbine engine, maintained at a distance from the outer surface of the hot combustor wall. Improved cooling of the hot combustor wall results from the addition of impingement cooling air injected through orifices in the cold combustion wall directed at the hot combustion wall.

The cold combustor wall has an outer surface in contact with cool compressed air and includes a pattern of air impingement inlet orifices through the cold combustor wall for conducting compressed air from the outer surface of the cold combustor wall in compressed air jets directed at the outer surface of the hot combustor wall.

Conventionally the hot combustor wall includes air film inlet orifices through the hot combustor wall for conducting compressed air from the outer surface of the hot combustor wall in a cooling air film along the inner surface of the hot combustor wall in the hot gas flow direction. The provision of a cold combustor wall improves conventional air film cooling by adding impingement cooling and reusing the air after impingement to form the conventional air film. The invention is equally applicable to hot combustor walls using conventional effusion cooling and splash louver cooling film systems as well.

Preferably the cold combustor wall is connected to the hot combustor wall at the upstream and downstream end, with a thermal expansion joint connected to the hot combustor wall at the downstream end thereby reducing thermally induced stresses. The thermal expansion joint has interlocking tongues and grooves, with sliding seal surfaces disposed on parallel adjacent sides of each tongue.

The thermal expansion joint reduces thermally induced stresses which result from the heat of combustion and the temperature differential between the hot and cold combustor walls. The sliding seal provides sealing between the compressed air supply, the intermediate air chamber, and the hot gas flow.

The cold combustor wall provides impingement cooling of the hot combustor wall, in addition to the conventionally used cooling systems of the hot combustor wall, such as air curtain louvers, effusion cooling and splash louver cooling. The air used for impingement cooling is captured within the intermediate chamber between parallel cold and hot combustor walls and is then ducted through the hot combustor wall to form a cooling air curtain. The cooling air from the compressor is therefore used once for impingement then reused in the air curtain cooling system.

By choosing the location and pattern of impingement holes, a designer may custom tailor the impingement cooling to compensate for any deficiency in the air film cooling in particular areas. For example, air films are produced by conducting compressed air through the hot combustor wall via filming devices (louvres or rows of small holes) which direct the air in a uniform curtain along the wall of the combustor. The filming devicesare spaced apart progressively downstream along the length of the hot combustor wall. As the cooling air film travels down the inner surface of the hot combustor wall, the air film degrades due to mixing with the hot combustion gases and heat absorption. The spacing of filming devices is determined by the rate of degradation to maintain an adequate cooling air film along the length of the hot combustor wall.

By providing impingement cooling jets, the designer may compensate for such air film degradation by providing increasing impingement cooling as the air film cooling degrades between rows of air filming devices.

The cold combustor wall further serves as a radiant heat barrier which can protect adjacent cooled components such as hydraulic lines etc. Further details of the invention and its advantages will be apparent from the detailed description and drawings included below.

BRIEF DESCRIPTION OF THE DRAWINGS

In order that the invention may be readily understood, one preferred embodiment of the invention will be described by way of example, with reference to the accompanying drawings wherein.

DETAILED DESCRIPTION OF PREFERRED EMBODIMENTS

Figure 1:
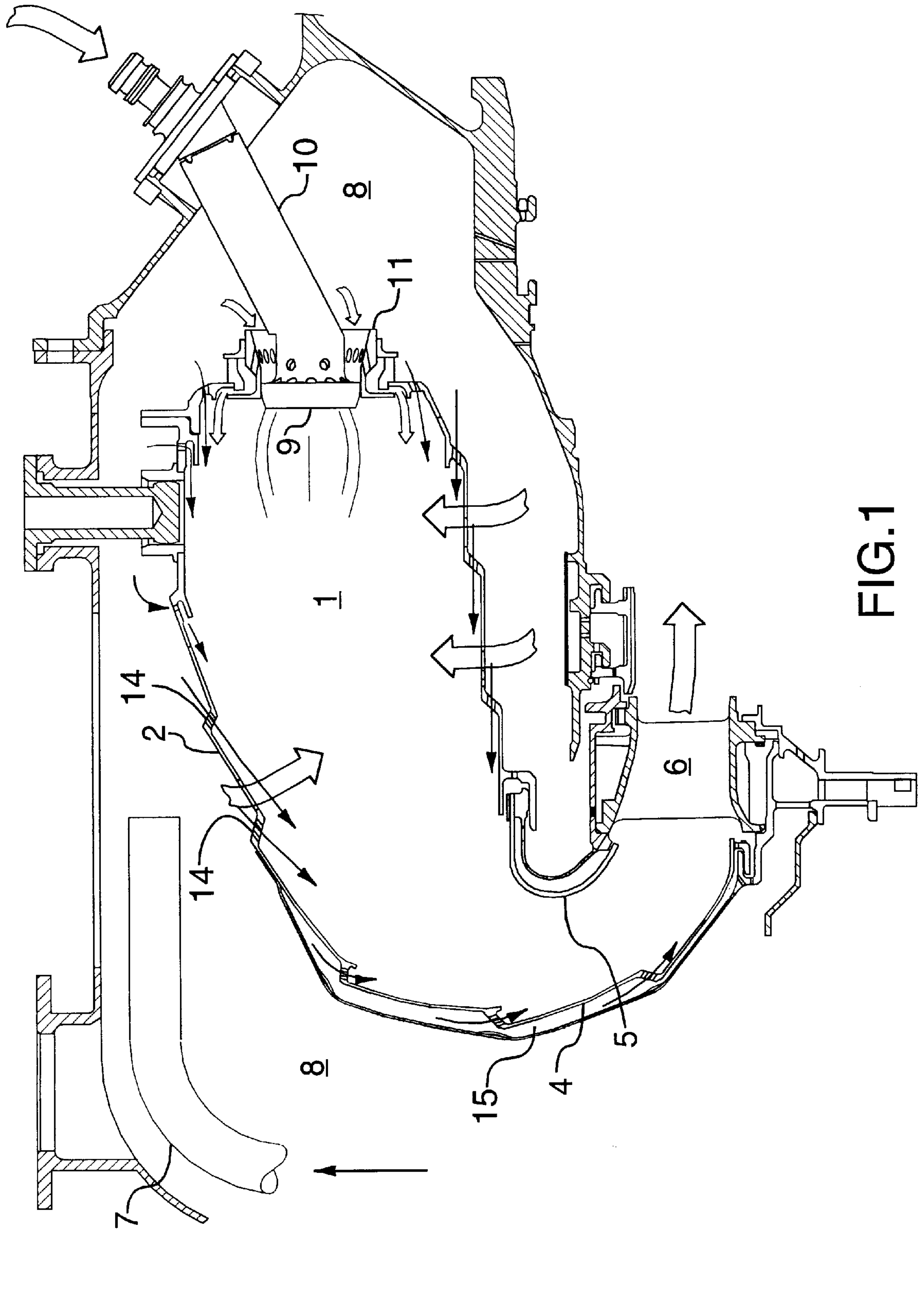
FIG. 1 is an axial cross-sectional view through a gas turbine engine combustor showing (towards the left) a diffuser pipe for conducting compressed air from the engines compressor section into a plenum surrounding the combustor, and (to the right) a fuel nozzle and surrounding annular nozzle cup projecting through the dome wall of the combustor.

FIG. 1 illustrates a reverse flow combustion chamber or combustor arrangement which will be briefly described. The combustor 1 is defined within hot combustor walls 2 and 3 including large exit duct 4 and small exit duct 5 which direct the hot combustion gases past a stator turbine 6 stage. For the purposes of this description, it will be understood that the term "hot combustor wall" equally applies to all combustor walls 2, 3, 4, and 5. In the embodiment shown, the invention is only applied to what is considered to be the most advantageous location on the large exit duct 4 which will heretofore be referred to with the general inclusive term "hot combustor wall 4" for simplicity.

Cold compressed air is fed from a rotary impeller (not shown) through a series of diffuser pipes 7 into a compressed air plenum 8 which completely surrounds the annular combustor 1. Liquid fuel is fed to the fuel nozzle 9 through fuel supply tube 10.

As indicated in FIG. 1 with arrows, the compressed air housed within the plenum 8 is all ducted through openings in the nozzles cups 11, openings in the hot combustor walls 2, 3, and particularly hot combustor wall 4. The compressed air forms a curtain of cooling air between the hot combustion gases and the metal components of the combustor 1 and provides air to mix with the fuel for efficient combustion.

Figure 2:
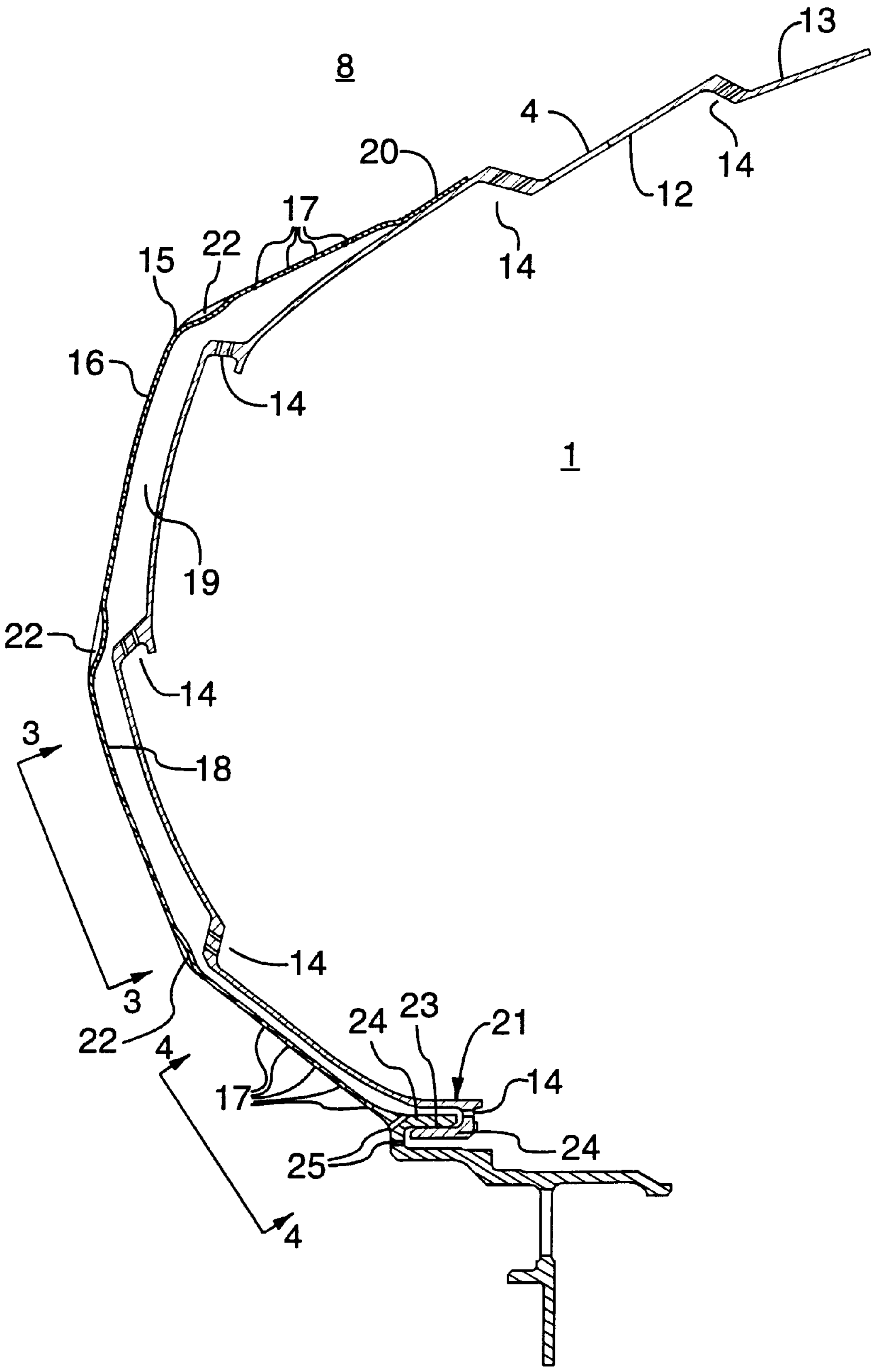
FIG. 2 is a like axial cross-sectional view showing a detail of the hot combustor wall in the large exit duct area, together with the sliding expansion joint at the downstream end.
Figure 3:
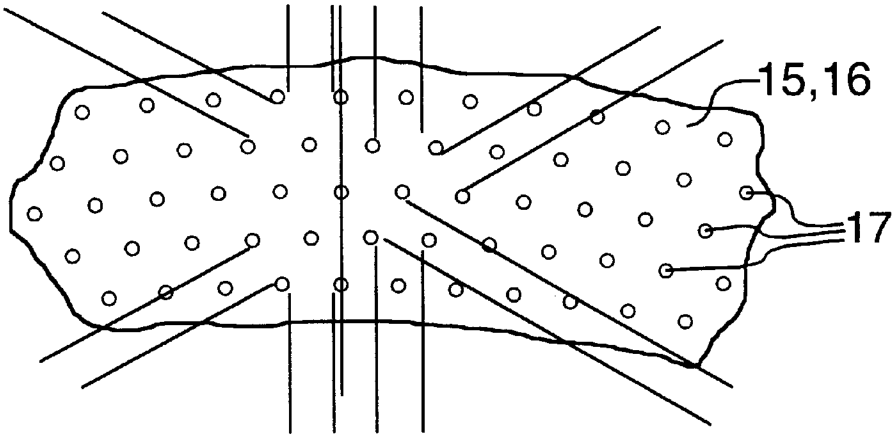
FIG. 3 is a detailed view along the lines of 3—3 in FIG. 2 showing the pattern of impingement inlet orifices through the cold combustor wall.

Turning to the specific details shown in FIG. 2, the gas turbine engine combustor 1 includes a hot combustor wall 4 connected downstream to a turbine stage 6 (not shown in FIG. 2). The hot combustor wall 4 has an inner surface 12 in communication with hot combustion gas flowing in the direction of the turbine stage 6. The outer surface 13 of the hot combustor wall 4 is in contact with cool compressed air provided to the plenum 8 by the diffuser pipes 7.

The hot combustor wall 4 includes air film inlet orifices 14 which extend through the hot combustor wall 4 and conduct compressed air from the outer surface 13 in a cooling air film (as indicated with arrows in FIG. 1) along the inner surface 12 of the hot combustor wall 4 in the hot gas flow direction. The air film inlet orifices 14 are spaced at intervals progressively downstream along the length of the hot combustor wall 4. Those skilled in the art will recognize this structure as a conventional combustor arrangement. Other conventional arrangements include effusion holes extending more or less continuously along the entire length of the hot combustor wall 4 and conventional use of splash louvers. It will be understood that the invention is equally applicable to any of these conventional hot combustor wall cooling and air film forming arrangements.

As best shown in FIG. 2, the combustor 1 also includes a cold combustor wall 15 which in the embodiment shown is generally parallel to the hot combustor wall 4. The cold combustor wall 15 is disposed at a selected distance from the outer surface 13 of the hot combustor wall 4. The cold combustor wall has an outer surface 16 in contact with the cool compressed air in the plenum 8. The cold combustor wall 15 is perforated with a number of air impingement inlet orifices 17. Compressed air flows from the plenum 8 through the transverse air impingement inlet orifices 17 through the cold combustor wall 15 thereby creating a plurality of impinging compressed air jets directed transversely at the outer surface 13 of the hot combustor wall 4.

From the positioning of the impingement orifices 17 relative to the air film orifices 14, it can be seen that the embodiment illustrated in FIG. 2 uses air impingement cooling immediately upstream of the air film inlet orifices 14 for the following reasons. As the compressed air travels parallel to and along the inner surface 12 of the hot combustor wall 4 from the air film inlet orifices 14, the air film as it initially exits from the orifices 14 is adequate to cool the hot combustor wall 4. Further downstream however, the air film emitted from the orifices 14 degrades when heated and mixed with the hot combustion gases in the interior of the combustor 1. Therefore, the efficiency of cooling by the air film emitted from orifices 14 decreases in proportion to the distance traveled from the orifice 14.

To compensate for the reduction in cooling efficiency therefore, the invention provides a series of transversely directly air impinging jets directed at the outer surface 13 of the hot combustor wall 4. The inner surface 18 of the cold combustor wall 15 and the outer surface 13 of the hot combustor wall 4 define an intermediate chamber 19 which captures the compressed air which has been used for impingement cooling and conducts the partially heated air through the air film inlet orifices 14. Improved cooling efficiency of the hot combustor wall 4 results from the combination of impingement jet cooling and the dual functioning of the compressed air which is used both for the impingement cooling function and the air film cooling function progressively.

At the upstream end 20, the cold combustor wall 15 is connected by welding or brazing to the outer surface 13 of the hot combustor wall 4. In the embodiment shown, this connection is tapered for aerodynamic efficiency.

To maintain the cold combustor wall 15 at a distance from the hot combustor wall 4 between the upstream end 20 and the downstream end 21, the cold combustor wall 15 includes spacers 22 projecting from the inner surface 18 of the cold combustor wall 15 in sliding engagement with the outer surface 13 of the hot combustor wall 4. The drawings show projections formed as dimples 22 disposed at discrete points on the inner surface 18 of the cold combustor wall 15. Since the cold combustor wall 15 is a sheet metal structure, forming dimples 22 is a simple procedure. However, it will be understood that the invention is not restricted to the specific form illustrated in the drawings.

Figure 4:
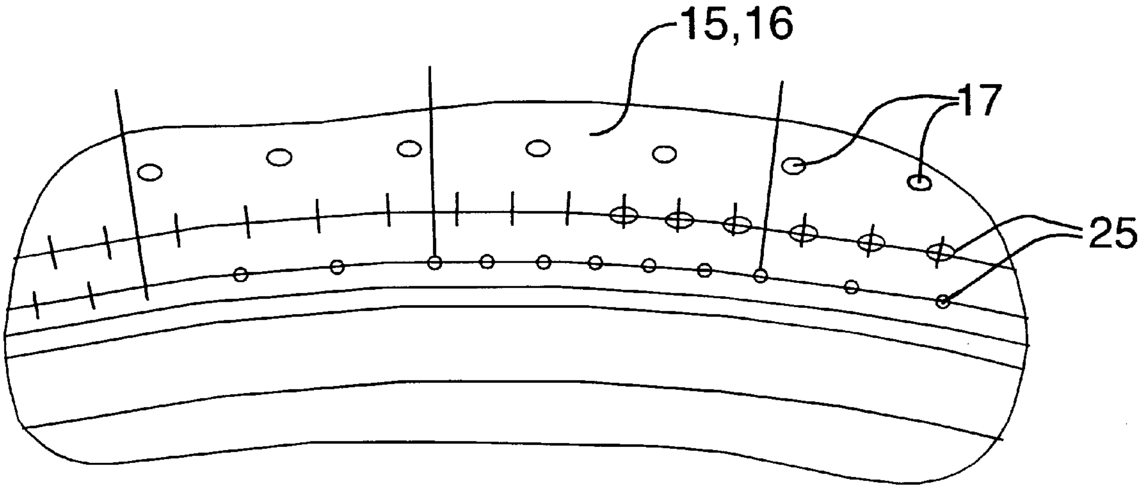
FIG. 4 is a like detail view showing the air impingement inlet orifices through the cold combustor wall adjacent to the downstream end and sliding expansion joint.

At the downstream end 21, the cold combustor wall 15 includes a thermal expansion joint 21 connected to the hot combustor wall 4. The downstream ends of the cold and hot combustor walls 4 and 15 have interlocking tongues and grooves with sliding sealed surfaces 23 disposed on parallel adjacent sides of each tongue 24. As indicated in FIGS. 2 and 4, the expansion joint also includes a flow of compressed cooling air which enters the expansion joint through openings 25 and is conducted into the hot gas flow within the combustor 1. In this manner, the interlocking tongues 24 and grooves of the thermal expansion joint are cooled with a flow of cool compressed air from the plenum 8, and the effects of radial differential thermal expansion are minimized.

The expansion joint allows for differential thermal expansion between the hot combustor wall 4 and cold combustor wall 15. Allowance for sliding of the hot combustor wall 4 relative to the cold combustor wall 15 is necessary to relieve thermally induced stresses, and as well to ensure that the intermediate chamber 19 remains open and of a sufficient size to effect the impingement cooling function.

Although the above description and accompanying drawings relate to a specific preferred embodiment as presently contemplated by the inventors, it will be understood that the invention in its broad aspect includes mechanical and functional equivalents of the elements described and illustrated.

The embodiments of the invention in which an exclusive property or privilege is claimed are defined as follows:

1. A reverse flow gas turbine engine combustor comprising:

a one piece hot combustor wall connected downstream to a turbine stage, the hot combustor wall having an inner surface in communication with hot combustion gas flowing in a direction toward the turbine stage and an outer surface in contact with cool compressed air, the hot combustor wall including air film cooling means, comprising a plurality of air film inlet orifices through the hot combustor wall, the inlet orifices being disposed in a series of circular peripheral rings spaced apart along the length of the hot combustor wall, for conducting compressed air from the outer surface of the hot combustor wall in a cooling air film along the inner surface of the hot combustor wall in the hot gas flow direction;

a one piece cold combustor wall fixed to the hot combustor wall at an upstream end in a sealed continuous joint, the cold combustor wall being disposed at a distance from the outer surface of the hot combustor wall defining a partial annular toroid-shaped external air chamber between an inner surface of the cold combustor wall and the outer surface of the hot combustor wall, the cold combustor wall having an outer surface in contact with cool compressed air and including air impingement cooling means, comprising a plurality of air impingement inlet orifices through the cold combustor wall, for conducting compressed air from the outer surface of the cold combustor wall in a plurality of impinging compressed air jets directed at the outer surface of the hot combustor wall, the impinging air jets being disposed in a series of discrete peripheral bands spaced apart along the length of the cold combustor wall between the rings of inlet orifices of the hot combustor wall; and a continuous circumferential thermal expansion joint connected to the hot combustor wall at a downstream end, the thermal expansion joint comprising sliding seal surfaces engaging the downstream ends of the cold and hot combustor walls, wherein the downstream ends of the cold and hot combustor walls have interlocking tongues and grooves, the sliding seal surfaces disposed on parallel adjacent sides of each tongue.

2. A cold combustor wall according to claim 1 wherein the cold combustor wall includes spacer means for maintaining the cold combustor wall at a distance from the hot combustor wall between the upstream and downstream ends.

3. A cold combustor wall according to claim 2 wherein the spacer means comprise projections from the inner surface of the cold combustor wall.

* * * * *

UNITED STATES PATENT AND TRADEMARK OFFICE

CERTIFICATE OF CORRECTION

PATENT NO. : 6,079,199
DATED : June 27, 2000
INVENTOR(S) : Kian McCaldon, et al

It is certified that error appears in the above-indentified patent and that said Letters Patent is hereby corrected as shown below:

On the title page, item [75] Inventors:

"Robert Ming Lap Aze" should be corrected to --Robert Ming Lap Sze--.

Signed and Sealed this

Third Day of April, 2001

Attest:

Nicholas P. Godici

NICHOLAS P. GODICI

*Attesting Officer* — *Acting Director of the United States Patent and Trademark Office*